US009315384B2

(12) United States Patent
Noda et al.

(10) Patent No.: US 9,315,384 B2
(45) Date of Patent: Apr. 19, 2016

(54) APPARATUS FOR PRODUCING NANOCARBON MATERIAL AND METHOD FOR PRODUCING NANOCARBON MATERIAL

(75) Inventors: Suguru Noda, Tokyo (JP); Toshio Osawa, Tokyo (JP); Dong Young Kim, Tokyo (JP); Eisuke Haba, Tsukuba (JP); Shunsuke Ueda, Tsukuba (JP)

(73) Assignees: HITACHI CHEMICAL COMPANY, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 354 days.

(21) Appl. No.: 13/579,627

(22) PCT Filed: Feb. 17, 2011

(86) PCT No.: PCT/JP2011/053420
§ 371 (c)(1),
(2), (4) Date: Oct. 3, 2012

(87) PCT Pub. No.: WO2011/102433
PCT Pub. Date: Aug. 25, 2011

(65) Prior Publication Data
US 2013/0017142 A1    Jan. 17, 2013

(30) Foreign Application Priority Data

Feb. 19, 2010   (JP) ............................... P2010-035239

(51) Int. Cl.
*B01J 19/00* (2006.01)
*B01J 19/24* (2006.01)
(Continued)

(52) U.S. Cl.
CPC ............. *C01B 31/0206* (2013.01); *B82Y 30/00* (2013.01); *B82Y 40/00* (2013.01)

(58) Field of Classification Search
CPC .... C01B 31/00; C01B 31/02; C01B 31/0206; C01B 31/0213; C01B 31/022; C01B 31/0226; C01B 31/0233; C01B 31/024; C01B 31/0246; C01B 31/0293; C01B 31/08; C01B 31/088; C01B 31/089; C01B 31/10; B01J 20/00; B01J 20/02; B01J 20/20; B01J 20/205; B01J 21/18; B01J 21/185; B01J 19/00; B01J 19/24
USPC .......... 422/129; 977/700, 734–737, 742–745, 977/748–750, 752, 788, 840, 842–845, 890, 977/891
See application file for complete search history.

(56) References Cited

U.S. PATENT DOCUMENTS

| 6,887,291 B2* | 5/2005 | Alford et al. ..................... 55/302 |
| 7,563,427 B2* | 7/2009 | Wei et al. ................... 423/447.3 |
| 2011/0085961 A1* | 4/2011 | Noda et al. ................ 423/447.3 |

FOREIGN PATENT DOCUMENTS

| JP | 2002-265209 | 9/2002 |
| JP | 2004-091959 | 3/2004 |

(Continued)

OTHER PUBLICATIONS

CN office action of Appln. No. 201180007889.0 dated Nov. 4, 2013.
(Continued)

*Primary Examiner* — Natasha Young
(74) *Attorney, Agent, or Firm* — Fitch, Even, Tabin & Flannery LLP (57) ABSTRACT

The present invention provides a carbon nanomaterial production apparatus 1 that includes a reaction tube 2 into which raw material gas and carrier gas are supplied and accordingly in which carbon nanomaterial is grown, a connection tube 4 that is connected to the reaction tube 2 and through which an aerosol-like mixture of the carbon nanomaterial and the carrier gas passes, and a collection tube 3 that is connected to the connection tube 4 and collects the carbon nanomaterial from the mixture. The collection tube 3 includes a discharge section 32 that is located above a junction 33 with the connection tube 4 and discharges the carrier gas contained in the mixture to outside, and a trapping section 31 that is located below the junction 33 with the connection tube 4 and traps the carbon nanomaterial that is separated from the mixture by gravitational sedimentation.

13 Claims, 4 Drawing Sheets

(51) Int. Cl.
  *B01J 20/00* (2006.01)
  *B01J 20/02* (2006.01)
  *B01J 20/20* (2006.01)
  *B01J 21/18* (2006.01)
  *C01B 31/02* (2006.01)
  *B82Y 30/00* (2011.01)
  *B82Y 40/00* (2011.01)
  *C01B 31/00* (2006.01)
  *C01B 31/08* (2006.01)
  *C01B 31/10* (2006.01)

(56) References Cited

FOREIGN PATENT DOCUMENTS

| JP | 2004-269298 | 9/2004 |
|---|---|---|
| JP | 2005-008456 | 1/2005 |
| JP | 2006-232595 | 9/2006 |
| JP | 2008-188565 | 8/2008 |
| WO | WO 2009/081645 A1 | 7/2009 |
| WO | WO 2009/110591 A1 | 9/2009 |
| WO | WO 2009110591 A1 * | 9/2009 |

OTHER PUBLICATIONS

International Search Report of Appln. No. PCT/JP2011/053420 dated Apr. 19, 2011 in English.
International Preliminary Report on Patentability of Appln. No. PCT/JP2011/053420 dated Sep. 27, 2012 in English.
English language machine translation of JP 2002-265209; 13 pages.

* cited by examiner

APPARATUS FOR PRODUCING NANOCARBON MATERIAL AND METHOD FOR PRODUCING NANOCARBON MATERIAL

This application is the US-national stage of PCT application PCT/JP2011/053420, now WO 2011/102433, filed 17 Feb. 2011 and claiming the priority of Japanese patent application JP 2010-035239 itself filed 19 Feb. 2010.

TECHNICAL FIELD

The present invention relates to a carbon nanomaterial production apparatus and a carbon nanomaterial production method using the production apparatus.

BACKGROUND ART

As a technique in this type of field, there is a carbon nanotube production apparatus described in Patent Literature 1, for example. In this apparatus, by supplying raw material gas containing a carbon source and a catalyst and carrier gas from the top of a reaction tube, carbon nanotubes are grown and synthesized during the descent thereof through the reaction tube (so-called vapor phase growth method). In addition, in a carbon nanomaterial production apparatus described in Patent Literature 2, by supplying carbon raw material and fluid gas to catalyst carriers in a reaction section, carbon nanomaterials are grown.

CITATION LIST

Patent Literature

[Patent Literature 1] PCT Application Publication No. WO 2009/081645
[Patent Literature 2] Japanese Patent Application Laid-Open Publication No. 2008-188565

SUMMARY OF INVENTION

Technical Problem

For example, in the carbon nanotube production apparatus described in Patent Literature 1, carbon nanotubes grown in the reaction tube are carried to a collection apparatus by the flow of carrier gas. This collection apparatus includes a filter installed in a discharge tube provided to the bottom of the reaction tube, the carbon nanotubes are trapped by the filter. However, to collect a large amount of carbon nanotubes exceeding the trapping capacity of one filter, sequentially replacing the filter is necessary, and the collection operation is complicated.

In addition, in the carbon nanomaterial production apparatus described in Patent Literature 2, carbon nanomaterials grown on catalyst carriers in the reaction section are collected together with the catalyst carriers by a collection apparatus. After this collection process, it is necessary to refine the carbon nanomaterials by acid treatment or the like to separate them from the catalyst carriers, and thus the collection operation is complicated. Accordingly in such conventional carbon nanomaterial collection apparatuses, a technique enabling a large amount of carbon nanomaterials to be easily collected has been required.

The present invention is made to solve the problems described above, and aims to provide a carbon nanomaterial production apparatus that can easily collect a large amount of carbon nanomaterials and a carbon nanomaterial production method using the production apparatus.

Solution to Problem

To solve the above-mentioned problems, a carbon nanomaterial production apparatus of the present invention includes a reaction tube into which raw material gas and carrier gas are supplied and accordingly in which carbon nanomaterial is grown; a connection tube that is connected to the reaction tube and through which an aerosol-like mixture of the carbon nanomaterial and the carrier gas passes; and a collection tube that is connected to the connection tube and collects the carbon nanomaterial from the mixture. The collection tube includes a discharge section that is located above a junction with the connection tube and discharges the carrier gas contained in the mixture to outside, and a trapping section that is located below the junction with the connection tube and traps the carbon nanomaterial that is separated from the mixture by gravitational sedimentation.

In this carbon nanomaterial production apparatus, the carbon nanomaterial grown in the reaction tube is carried by the flow of the carrier gas, passing through the connection tube as the mixture, and are sent to the collection tube. In the carbon nanomaterial production apparatus herein, the discharge section is provided above the junction with the connection tube, and the trapping section is provided below the junction with the connection tube. Accordingly, while the carrier gas contained in the mixture flows upward from the junction and is discharged from the discharge section, the carbon nanomaterial in the mixture falls downward from the junction by gravitational sedimentation to be separated from the mixture and is trapped by the trapping section. Therefore, in this carbon nanomaterial production apparatus, a large amount of carbon nanomaterials can be easily collected.

In addition, the discharge section is preferred to be provided with a filter that blocks the carbon nanomaterial.

There are occasions when part of the carbon nanomaterial sent to the collection tube rises upward above the junction with the connection tube by the flow of the carrier gas before being trapped by the trapping section by gravitational sedimentation. For such occasion, by providing the filter to the discharge section, it is possible to prevent the carbon nanomaterial from flowing into the discharge section. In addition, the carbon nanomaterial blocked by the filter falls by gravitational sedimentation when it accumulates in a certain amount and is trapped by the trapping section. Accordingly, in this carbon nanomaterial production apparatus, a larger amount of carbon nanomaterials can be easily collected.

In addition, the connection tube is preferred to incline so that the mixture flows falling from the reaction tube toward the collection tube.

By making the connection tube incline such that the mixture flows falling from the reaction tube toward the collection tube in this manner, it is possible to suppress stagnation of the mixture in the connection tube, and make the mixture move smoothly to the collection tube.

In addition, it is preferable that the reaction tube have a main reaction section that has catalyst carriers inside and in which the carbon nanomaterial around the catalyst carriers is grown and the carbon nanomaterial is peeled from the catalyst carriers by agitation of the catalyst carriers with the carrier gas; and a separation section that is located above the main reaction section and in which the catalyst carriers falling without being accompanied by the carrier gas and the carbon nanomaterial being accompanied by the carrier gas is separated, in which a cross-sectional area of the separation section is larger than a cross-sectional area of the main reaction section.

With this configuration, the flow rate of the carrier gas in the separation section can be made lower than the flow rate of the carrier gas in the main reaction section. Accordingly, in the main reaction section, peeling of the carbon nanomaterial from the catalyst carriers is promoted by increasing the flow rate of the carrier gas to thoroughly stir it and, in the separation section, falling of the catalyst carriers is promoted by decreasing the flow rate of the carrier gas, whereby separation of the catalyst carriers and the carbon nanomaterial can be facilitated. This eliminates the need for refining the carbon nanomaterial to separate it from the catalyst carriers after collecting the catalyst carriers on which the carbon nanomaterial has grown as in conventional carbon nanomaterial production apparatuses, thereby facilitating the collecting procedure of the carbon nanomaterial.

In addition, it is preferable that the reaction tube have an introduction section that is positioned above the separation section and serves as a junction with the connection tube, in which the cross-sectional area of the separation section is larger than a cross-sectional area of the introduction section.

With this configuration, the flow rate of the carrier gas in the introduction section can be made higher than the flow rate of the carrier gas in the separation section. Accordingly, it is possible to suppress stagnation of the mixture of the carbon nanomaterial and the carrier gas in the introduction section, and make the mixture move smoothly from the separation section to a connection section.

In addition, a cross-sectional area of the collection tube is preferred to be larger than a cross-sectional area of the connection tube.

With this configuration, the flow rate of the carrier gas in the collection tube can be made lower than the flow rate of the carrier gas in the connection tube. Accordingly, because the influence of the flow of the carrier gas on the carbon nanomaterial becomes small, gravitational sedimentation of the carbon nanomaterial is effectively performed, and thus the carbon nanomaterial becomes more likely to fall in the trapping section of the collection tube. Therefore, collection of the carbon nanomaterial is efficiently performed.

In addition, the collection tube is preferred to further include a release valve for releasing the carbon nanomaterial trapped in the trapping section to outside.

By opening the release valve, the carbon nanomaterial trapped in the trapping section is released to outside, and thus can be easily collected.

A carbon nanomaterial production method of the present invention is a production method using the carbon nanomaterial apparatus described above.

In conventional carbon nanomaterial production methods, a step of taking out catalyst carriers from inside of a fluidized-bed apparatus filled with the catalyst carriers to which grown carbon nanomaterials stick, a step of separating and collecting the carbon nanomaterials from the catalyst carriers by liquid-phase treatment or the like, and a step of refilling the fluidized-bed apparatus with the catalyst carriers are indispensable. In addition, in a batch method in which a step of supplying carrier gas or the like, a step of growing carbon nanomaterials, and a step of collecting the carbon nanomaterials from the mixture are sequentially performed one by one, a step of stopping and cooling the fluidized-bed apparatus before the step of taking out the catalyst carriers and a step of starting up and heating the fluidized-bed apparatus after the step of refilling with the catalyst carriers will be further necessary. To performing these series of steps, a huge amount of time is required compared to the growing time of the carbon nanomaterials, so that there is a problem in production efficiency. In contrast, with the production method of the present invention, by simply changing conditions of the carrier gas at a constant temperature maintained, only the carbon nanomaterial can be separated and collected. Accordingly, a time required for the series of steps can be significantly shortened, whereby production efficiency of carbon nanomaterials can be enhanced.

In addition, in conventional carbon nanomaterial production methods, ancillary facilities such as a mechanism for taking out hot catalyst carriers from a fluidized-bed apparatus and a mechanism for separating carbon nanomaterials from the catalyst carriers thus taken are necessary, and thus there are occasions such ancillary facilities are larger than the fluidized-bed apparatus. In contrast, with the production method of the present invention, because the carbon nanomaterial is separated and collected from catalyst carriers by carrying them on the flow of the carrier gas, the carbon nanomaterial can be produced in a single apparatus.

Furthermore, when separating carbon nanomaterial from catalyst carriers by liquid-phase treatment after taking out them together with the catalyst carriers from the fluidized-bed apparatus as in conventional carbon nanomaterial production methods, the carbon nanomaterial will be wet with the treatment liquid. In this case, the carbon nanomaterial needs to be dried, but the carbon nanomaterial might tightly cohere when being dried, and accordingly a limitation might arise in after-treatment. In addition, quality deterioration in the carbon nanomaterial such as contamination by impurities from the treatment liquid might occur. In contrast, with the carbon nanomaterial production method of the present invention, by carrying the carbon nanomaterial on the flow of the carrier gas to separate and collect them, highly pure (99 wt %) carbon nanomaterial can be obtained. This facilitates various processes in downstream steps for the carbon nanomaterial.

Advantageous Effects of Invention

According to the present invention, it is possible to provide a carbon nanomaterial production apparatus that can easily collect a large amount of carbon nanomaterials and a carbon nanomaterial production method using the production apparatus.

DESCRIPTION OF EMBODIMENTS

Preferred embodiments of a carbon nanomaterial production apparatus and a carbon nanomaterial production method according to the present invention will be described in detail hereinafter with reference to the drawings.

Figure 1:
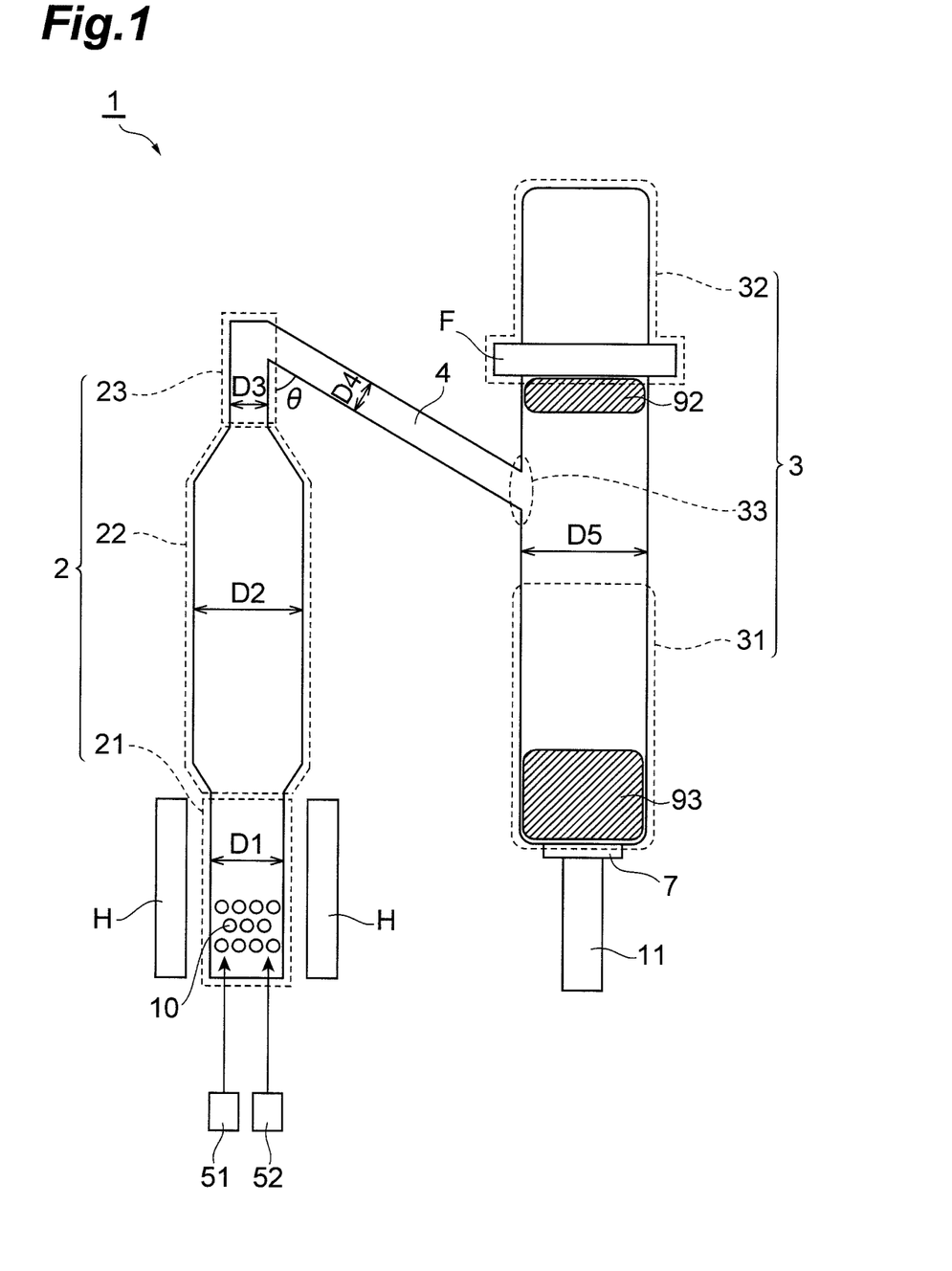
FIG. 1 is a diagram illustrating one embodiment of a carbon nanomaterial production apparatus according to the present invention.

FIG. 1 is a diagram illustrating one embodiment of a carbon nanomaterial production apparatus according to the present invention. As depicted in the drawing, this carbon nanomaterial production apparatus 1 includes a reaction tube 2 for growing carbon nanomaterials, a collection tube 3 for collecting the carbon nanomaterials grown in the reaction tube 2, a connection tube 4 connecting the reaction tube 2 and the collection tube 3, and a heating section H for heating the reaction tube 2. Herein, the carbon nanomaterials are carbon materials sizes of which at least in one direction are in nanometers or in micrometers, and are the carbon materials having various shapes such as a shape of fiber and a shape of (hollow) tube.

Each of the reaction tube 2, the collection tube 3, and the connection tube 4 is a glass tube or a stainless tube having a circular cross section. The reaction tube 2 has a main reaction section 21, a separation section 22, and an introduction section 23. The main reaction section 21 of the reaction tube 2 is a section into which raw material gas is supplied from a raw material gas supply source 51 and carrier gas is supplied from a carrier gas supply source 52 as depicted in FIG. 2(a) and accordingly in which carbon nanomaterials 9 are grown around catalyst carriers 10 such as ceramic beads. The main reaction section 21 is positioned on the bottom side of the reaction tube 2. In addition, as depicted in FIG. 1, a cross-sectional diameter D1 of the main reaction section 21 is 2.5 centimeters, for example. As the raw material gas, carbon raw material such as hydrocarbon gas is used. As the carrier gas, hydrogen, argon, or nitrogen, for example, is used. The carbon nanomaterials 9 grown around the catalyst carriers 10 in the main reaction section 21 is peeled from the catalyst carriers 10, and moves to the separation section 22 accompanied by the carrier gas as depicted in FIG. 3(a). In addition, parts of the catalyst carriers 10 from which the carbon nanomaterials 9 are peeled move to the separation section 22.

The heating section H is a section for heating the main reaction section 21 to promote growth of the carbon nanomaterials 9 when growing the carbon nanomaterials 9 in the main reaction section 21. The heating section H is provided around the main reaction section 21 and maintains the temperature of the main reaction section 21 at about 800° C. when growing the carbon nanomaterials 9.

The separation section 22 is a section in which the catalyst carriers 10 falling without being accompanied by the carrier gas and the carbon nanomaterials 9 accompanied by the carrier gas are separated, and the separation section 22 is positioned above the main reaction section 21 as depicted in FIG. 3(a). In addition, as depicted in FIG. 1, a cross-sectional diameter D2 of the separation section 22 is five centimeters, for example, and is larger than the cross-sectional diameter D1 of the main reaction section 21. With this configuration, a cross-sectional area S2 of the separation section 22 is larger than a cross-sectional area S1 of the main reaction section 21, and in the separation section 22, the carbon nanomaterials 9 are accompanied by the carrier gas at a flow rate U2 that is lower than a flow rate U1 of the carrier gas in the main reaction section 21, and the catalyst carriers 10 fall without being accompanied by the carrier gas, whereby the catalyst carriers 10 and the carbon nanomaterials 9 are efficiently separated. The carbon nanomaterials 9 separated from the catalyst carriers 10 are conveyed together with the carrier gas 5 as an aerosol-like mixture M.

Note that the flow rate U1 is adjusted so as to be equal to or higher than a speed at which the carbon nanomaterials 9 can be separated from the catalyst carriers 10 by stirring the catalyst carriers 10. In addition, the flow rate U2 is adjusted so as to be equal to or lower than a speed (terminal velocity) at which the catalyst carriers 10 blow up to the introduction section 23 beyond the separation section 22.

In addition, an end portion of the separation section 22 near the main reaction section 21 is in a tapered shape such that its cross-sectional area becomes smaller as it comes closer to the main reaction section 21, and an end portion thereof near the introduction section 23 is in a tapered shape such that its cross-sectional area becomes smaller as it comes closer to the introduction section 23. With this configuration, even when the diameter of the separation section 22 is large, the catalyst carriers 10 are less likely to stagnate in corners of the separation section 22, whereby the catalyst carriers 10 entering the separation section 22 can be easily brought back to the main reaction section 21. In addition, the carbon nanomaterials separated from the catalyst carriers 10 can be flown smoothly into the introduction section 23.

The introduction section 23 is a section for introducing toward the connection tube 4 the mixture M of the carbon nanomaterials 9 and the carrier gas 5 that have passed through the separation section 22 as depicted in FIG. 3(b). The introduction section 23 is positioned further above the separation section 22. In addition a cross-sectional diameter D3 of the introduction section 23 is 2.5 centimeters, for example, and is larger than the cross-sectional diameter D2 of the separation section 22. Accordingly, the cross-sectional area S2 of the separation section 22 is larger than a cross-sectional area S3 of the introduction section 23, and a flow rate U3 of the carrier gas in the introduction section 23 is higher than the flow rate U2 of the carrier gas in the separation section 22, whereby the mixture M can be introduced from the separation section 22 to the connection tube 4.

The connection tube 4 is a part for introducing the mixture M of the carbon nanomaterials 9 and the carrier gas 5 from the reaction tube 2 to the collection tube 3. One end of the connection tube 4 is connected to a top portion of the introduction section 23 and the other end thereof is connected to a middle portion of the collection tube 3. In addition, the connection tube 4 is in a state of inclining at a predetermined angle θ so that the mixture M introduced from the introduction section 23 flows falling toward the collection tube 3. This angle θ is appropriately set within a range between 1° or more and 90° or less, for example.

In addition, a cross-sectional diameter D4 of the connection tube 4 is 2.5 centimeters, for example, and is equivalent to the cross-sectional diameter D3 of the introduction section 23. Accordingly, a flow rate U4 of the carrier gas in the connection tube 4 is equivalent to the flow rate U3 of the carrier gas in the introduction section 23. These flow rates U3 and U4 are adjusted so that they are equal to or higher than a speed for enabling the carbon nanomaterials depositing or accumulating on an inner wall of the introduction section 23 or the connection tube 4 to be swept away. Note that both of the cross-sectional diameter D3 of the introduction section 23 and the cross-sectional diameter D4 of the connection tube 4 are preferred to be smaller than the cross-sectional diameter D1 of the main reaction section 21. In this case, the carbon nanomaterials 9 generated in the main reaction section 21 can be moved smoothly to the collection tube 3 via the introduction section 23 and the connection tube 4.

The collection tube 3 is a part for collecting the carbon nanomaterials 9 from the mixture M that have passed through the connection tube 4. This collection tube 3 has a trapping section 31 and a discharge section 32. The discharge section 32 is positioned above a junction 33 with the connection tube 4. The carrier gas is supplied from the carrier gas supply source 52 at atmospheric pressure or higher, and accordingly the carrier gas 5 in the mixture M flows upward from the junction 33 and is discharged to outside as depicted in FIG. 4(a).

In contrast, the trapping section 31 is positioned below the junction 33 between the connection tube 4 and the collection tube 3, and directly under the discharge section 32. In this trapping section 31, as depicted in FIG. 4(a), carbon nanomaterials 91 and 93 separated from the mixture M by gravitational sedimentation accumulate. Furthermore, the carbon nanomaterials 93 that have accumulated in the trapping section 31 are collected to outside by opening a release valve 7.

In addition, to the discharge section 32 described above, a filter F that blocks carbon nanomaterials 92 is provided. Accordingly, even when the carbon nanomaterials 92 rise up to above the junction 33 by the flow of the carrier gas 5 before being trapped in the trapping section 31 by gravitational sedimentation, the carbon nanomaterials 92 can be trapped by the filter F. The carbon nanomaterials 92 trapped by the filter F gravitationally sediment when a certain amount thereof has accumulated, and are trapped in the trapping section 31 as depicted in FIG. 4(b). Note that it is acceptable to periodically apply vibration to the filter F to promote the falling off of the carbon nanomaterials 92 from the filter F. Alternatively, it is acceptable to promote the falling off of the carbon nanomaterials 92 from the filter F by intermittently reducing the flow rate of the carrier gas or reversing the flow.

A cross-sectional diameter D5 of the collection tube 3 described above is eight centimeters, for example, and is larger than the cross-sectional diameter D4 of the connection tube 4. Accordingly, a cross-sectional area S5 of the collection tube 3 is larger than a cross-sectional area S4 of the connection tube 4, and a flow rate U5 of the carrier gas in the collection tube 3 is lower than the flow rate U4 of the carrier gas in the connection tube 4, whereby the carbon nanomaterials 91 is more likely to gravitationally sediment against the flow of the carrier gas 5. Note that the flow rate U5 is adjusted so as to be equal to or lower than a speed at which the carbon nanomaterials accumulating in the trapping section 31 of the collecting tube 3 will not rise.

Figure 2:
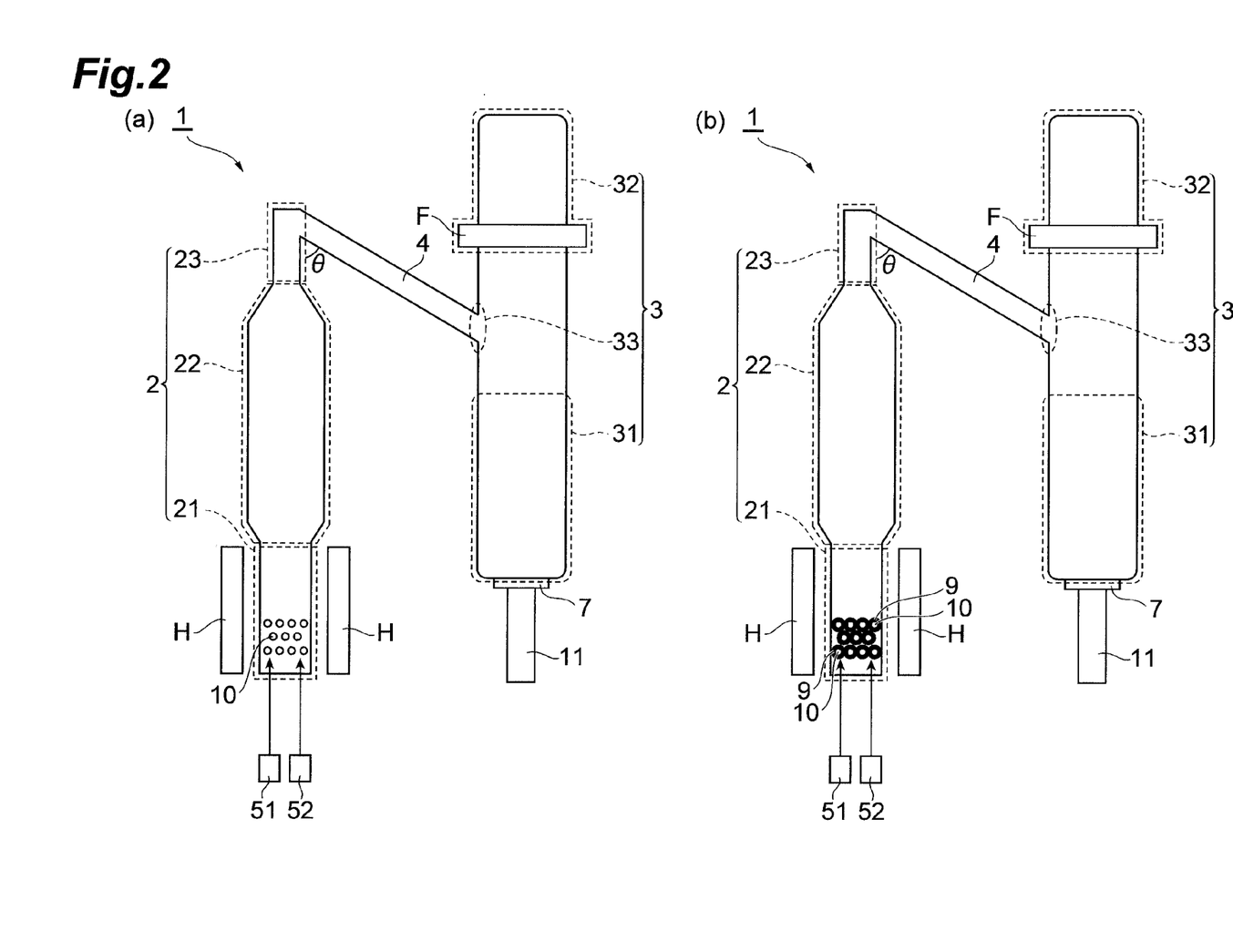
FIG. 2(a) is a diagram illustrating a state of supplying raw material gas and carrier gas to catalyst carriers in a main reaction section.
FIG. 2(b) is a diagram illustrating a state in which carbon nanomaterials have grown in the main reaction section.
Figure 3:
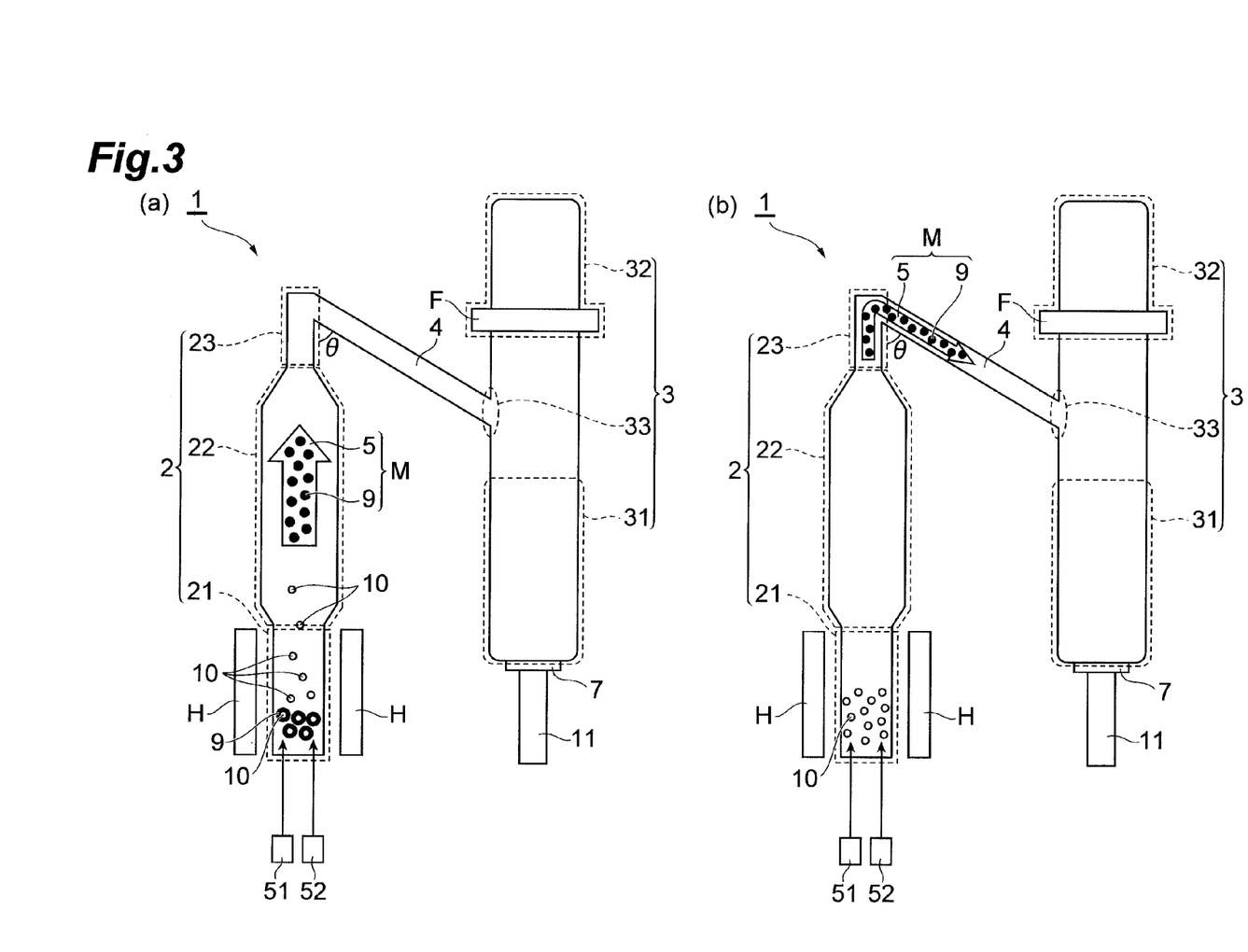
FIG. 3(a) is a diagram illustrating a state of separating the carbon nanomaterials and the catalyst carriers in a separation section.
FIG. 3(b) is a diagram illustrating a state in which a mixture of the carbon nanomaterials and the carrier gas passes through an introduction section and a connection tube.
Figure 4:
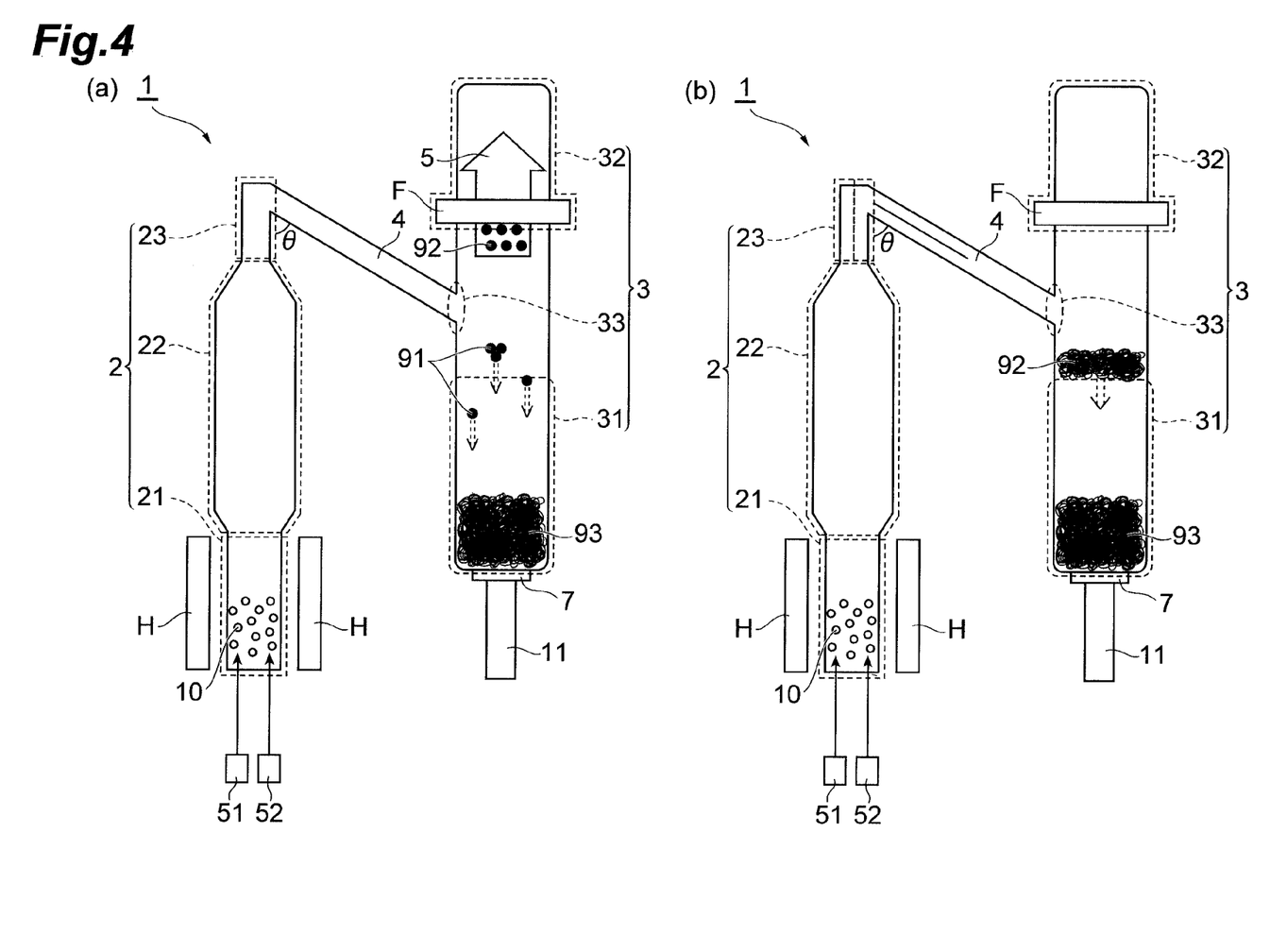
FIG. 4(a) is a diagram illustrating a state in which the carbon nanomaterials are trapped and also the carrier gas is discharged.
FIG. 4(b) is a diagram illustrating a state in which the carbon nanomaterials trapped by a filter fall into a trapping section.

In addition, the cross-sectional diameter D5 of the collection tube 3 is preferred to be equal to or larger than the cross-sectional diameter D2 of the separation section 22. In this case, capacity of the trapping section 31 of the collection tube 3 is sufficiently secured, and thus the collected amount of the carbon nanomaterials 91, 92, and 93 can be increased. Note that in FIG. 2 to FIG. 4, production flows of carbon nanomaterials are illustrated intermittently as a matter of convenience for explanation, but actually growth of the carbon nanomaterials is performed for a certain period of time, and thus a series of the flows depicted in FIG. 2 to FIG. 4 are performed continuously.

As described above, in this carbon nanomaterial production apparatus 1, the carbon nanomaterials 9 that have grown in the reaction tube 2 are carried by the flow of the carrier gas 5 and, passing through the connection tube 4 as the mixture M, are sent to the collection tube 3. In the carbon nanomaterial production apparatus 1 herein, the discharge section 32 is provided above the junction 33 with the connection tube 4, and the trapping section 31 is provided below the junction 33 with the connection tube 4. Accordingly, while the carrier gas 5 contained in the mixture M flows upward from the junction 33 and is discharged from the discharge section 32, the carbon nanomaterials in the mixture M fall downward from the junction 33 by gravitational sedimentation to be separated from the mixture M, and are trapped in the trapping section 31. Therefore, in this carbon nanomaterial production apparatus 1, without performing filter replacement or the like as in a conventional manner, a large amount of carbon nanomaterials can be easily collected. In addition, depending on the capacity of the trapping section 31 of the collection tube, a large amount of carbon nanomaterials can be collected at a time.

In addition, in this carbon nanomaterial production apparatus 1, because the carbon nanomaterials 9 are separated from the catalyst carriers 10 in advance by agitation, the need for using a refining process such as acid treatment that damages carbon nanomaterials is eliminated, whereby damages to the carbon nanomaterials due to such a refining process are eliminated.

A carbon nanomaterial production method according to the present invention is a production method using the carbon nanomaterial production apparatus 1. To perform a series of steps such as a step of taking out catalyst carriers from a fluidized-bed apparatus in conventional carbon nanomaterial production methods, a huge amount of time (several hours to several days) is required compared to the growing time of the carbon nanomaterials (about 10 minutes), so that there is a problem in production efficiency. In contrast, in the production method using this carbon nanomaterial production apparatus 1, by simply changing conditions of the carrier gas 5 at a constant temperature maintained, only the carbon nanomaterials 9 can be separated from the catalyst carriers 10 and collected. Accordingly, the time required for the series of steps can be significantly shortened. This can enhance production efficiency of the carbon nanomaterials.

In addition, in the production method using the carbon nanomaterial production apparatus 1, the carbon nanomaterials 9 are separated from the catalyst carriers 10 and collected by carrying them on the flow of the carrier gas 5, and accordingly the carbon nanomaterials can be produced by the carbon nanomaterial production apparatus 1 alone. Furthermore, with the production method using the carbon nanomaterial production apparatus 1, by carrying the carbon nanomaterials 9 on the flow of the carrier gas 5 to separate from the catalyst carriers 10 and collect them, highly pure (99 wt %) carbon nanomaterials can be obtained. This facilitates various processes in downstream steps for the carbon nanomaterials.

The carbon nanomaterial production apparatus 1 and the production method using the carbon nanomaterial production apparatus 1 in the present embodiment have been described above, but the present invention is not limited to them. For example, the cross-sectional shapes of the reaction tube 2, the collection tube 3, and the connection tube 4 may be an ellipse or a rectangle, for example, without being limited to a circle. In addition, in the example depicted in FIG. 1, the discharge section 32 is positioned directly above the trapping section 31, but alternatively the discharge section 32 may be provided at a position laterally shifted from directly above the trapping section 31 as long as it is above the junction 33 with the connection tube 4. Furthermore, when the flow rate U4 of the carrier gas flowing in the connection tube 4 is high enough to move the carbon nanomaterials, the angle θ of inclination of the connection tube 4 may be 90° or more.

REFERENCE SIGNS LIST

1 . . . carbon nanomaterial production apparatus, 2 . . . reaction tube, 21 . . . main reaction section, 22 . . . separation section, 23 . . . introduction section, 3 . . . collection tube, 31 . . . trapping section, 32 . . . discharge section, 33 . . . junction, 4 . . . connection tube, 7 . . . release valve, 11 . . . takeout section, F . . . filter, H . . .

heating section, 51 . . . raw material gas supply source, 52 . . . carrier gas supply source, 9, 91, 92, 93 . . . carbon nanomaterials

The invention claimed is:

1. A carbon nanomaterial production apparatus comprising:
   a reaction tube into which raw material gas and carrier gas are supplied and accordingly in which carbon nanomaterial is grown;
   a connection tube that is connected to the reaction tube and through which an aerosol-like mixture of the carbon nanomaterial and the carrier gas passes; and
   a collection tube that is connected to the connection tube and collects the carbon nanomaterial from the mixture, wherein
   the collection tube includes:
      a junction, connected to the connection tube, from which, while the carrier gas flows upward, the carbon nanomaterial falls downward by gravitational sedimentation to be separated from the mixture,
      a discharge section that is located above the junction with the connection tube and discharges the carrier gas contained in the mixture to outside, and
      a trapping section that is located below the junction with the connection tube and traps the carbon nanomaterial that is separated from the mixture by gravitational sedimentation.

2. The carbon nanomaterial production apparatus according to claim 1, wherein the discharge section is provided with a filter that blocks the carbon nanomaterial.

3. The carbon nanomaterial production apparatus according to claim 1, wherein the connection tube inclines so that the mixture flows falling from the reaction tube toward the collection tube.

4. The carbon nanomaterial production apparatus according to claim 3, wherein said connection tube is inclined at an angle within a range of 1° to 90° relative to the reaction tube.

5. The carbon nanomaterial production apparatus according to claim 1, wherein
   the reaction tube includes:
      a main reaction section that has catalyst carriers inside and in which the carbon nanomaterial around the catalyst carriers is grown and the carbon nanomaterial is peeled from the catalyst carriers by agitation of the catalyst carriers with the carrier gas; and
      a separation section that is located above the main reaction section and in which the catalyst carriers falling without being accompanied by the carrier gas and the carbon nanomaterial thus peeled being accompanied by the carrier gas is separated, and
      a cross-sectional area of the separation section is larger than a cross-sectional area of the main reaction section.

6. The carbon nanomaterial production apparatus according to claim 5, wherein
   the reaction tube further includes an introduction section that is positioned above the separation section and serves as a junction with the connection tube, and
   the cross-sectional area of the separation section is larger than a cross-sectional area of the introduction section.

7. The carbon nanomaterial production apparatus according to claim 6, wherein a first end portion of the separation section, adjacent the main reaction section, has a tapered shape such that its cross-sectional area becomes smaller as it approaches the main reaction section, and a second end portion of the separation section, adjacent the introduction section, has a tapered shape such that its cross-sectional area becomes smaller as it approaches the introduction section.

8. The carbon nanomaterial production apparatus according to claim 5, wherein a first end portion of the separation section, adjacent the main reaction section, has a tapered shape such that its cross-sectional area becomes smaller as it approaches the main reaction section.

9. The carbon nanomaterial production apparatus according to claim 5, wherein a cross-sectional diameter of the collection tube is larger than a cross-sectional diameter of the separation section.

10. The carbon nanomaterial production apparatus according to claim 1 wherein a cross-sectional area of the collection tube is larger than a cross-sectional area of the connection tube.

11. The carbon nanomaterial production apparatus according to claim 1, wherein the collection tube further includes a release valve for releasing the carbon nanomaterial trapped in the trapping section to outside.

12. A carbon nanomaterial production method performed using a carbon nanomaterial production apparatus according to claim 1, comprising:
   (a) supplying (i) raw material gas for growing carbon nanomaterial and carrier gas to said reactor tube, and growing carbon nanomaterial therein;
   (b) passing the aerosol-like mixture of the carbon nanomaterial and the carrier gas through said connection tube to said collection tube; and
   (c) collecting the carbon nanomaterial from the mixture in the collection tube,
   wherein, in the step (c), the carbon nanomaterial falls downward in said collection tube by gravitational sedimentation from said junction, and the carrier gas flowing upward from said junction in said collection tube and is discharged to outside, so as to separate the carbon nanomaterial and carrier gas in the collection tube.

13. A carbon nanomaterial production method comprising the steps of:
   (a) growing carbon nanomaterial in a reaction tube by supplying raw material gas and carrier gas;
   (b) passing an aerosol-like mixture of the carbon nanomaterial and the carrier gas through a connection tube that is connected to the reaction tube; and
   (c) collecting the carbon nanomaterial from the mixture in a collection tube that is connected to the connection tube,
   wherein the step (c) includes trapping the carbon nanomaterial that falls downward by gravitational sedimentation from a junction connected with the connection tube to be separated from the mixture, with discharging the carrier gas contained in the mixture, which flows upward from the junction, to outside.

\* \* \* \* \*